US007675402B2

(12) United States Patent
Lee et al.

(10) Patent No.: US 7,675,402 B2
(45) Date of Patent: Mar. 9, 2010

(54) NETWORK COMMUNICATION FOR A SECURITY SYSTEM

(75) Inventors: Albert Lee, Brooklyn, NY (US); Jaime E. Barahona, Hempstead, NY (US); James Ramroop, Bellport, NY (US)

(73) Assignee: Honeywell International Inc., Morristown, NJ (US)

( * ) Notice: Subject to any disclaimer, the term of this patent is extended or adjusted under 35 U.S.C. 154(b) by 507 days.

(21) Appl. No.: 10/945,236

(22) Filed: Sep. 20, 2004

(65) Prior Publication Data

US 2006/0064505 A1 Mar. 23, 2006

(51) Int. Cl.
*G06F 15/173* (2006.01)

(52) U.S. Cl. ......................... 340/5.54; 379/37; 709/238

(58) Field of Classification Search ................ 340/5.54, 340/825.52, 506, 528, 531, 539.1, 538; 379/167.07, 379/167.08, 37, 167.17; 370/495; 709/238
See application file for complete search history.

(56) References Cited

U.S. PATENT DOCUMENTS

| | | | | |
|---|---|---|---|---|
| 6,532,217 | B1 * | 3/2003 | Alkhatib et al. | 370/252 |
| 6,658,091 | B1 * | 12/2003 | Naidoo et al. | 379/37 |
| 6,741,171 | B2 * | 5/2004 | Palka et al. | 340/501 |
| 2001/0029585 | A1 * | 10/2001 | Simon et al. | 713/200 |
| 2001/0055954 | A1 * | 12/2001 | Cheng | 455/74.1 |
| 2002/0085538 | A1 * | 7/2002 | Leung | 370/352 |
| 2003/0227540 | A1 * | 12/2003 | Monroe | 348/14.02 |
| 2004/0086093 | A1 * | 5/2004 | Schranz | 379/37 |
| 2004/0100934 | A1 * | 5/2004 | Kachi | 370/338 |

OTHER PUBLICATIONS

Honeywell ADEMCO VISTA-10P Security System, Installation and Setup Guide, K0735V2, Apr. 2004, Rev. A, pp. 2-3, 3-1, 4-11.

* cited by examiner

*Primary Examiner*—Edwin C Holloway, III
(74) *Attorney, Agent, or Firm*—Husch Blackwell Sanders Welsh & Katz

(57) ABSTRACT

A keypad security apparatus and security system are provided. The keypad includes a network connector to connect the keypad to a data network, an address tracker to track an address assigned to the keypad, and a data input to receive user input data, including arm/disarm commands and to transmit the data via the data network. The network may be a LAN, such an Ethernet connecting the keypad via a router to an internet. A security control panel may also be connected to the local area network. Audio data may be input to the keypad and transmitted via the network voice data over data network, such as voice over IP data (VoIP). The address assigned to the keypad may be an IP address or a local area network address. The keypad may be connected as a wireless device.

10 Claims, 2 Drawing Sheets

VoIP Communication Paths

NETWORK COMMUNICATION FOR A SECURITY SYSTEM

FIELD OF THE INVENTION

This invention relates generally to the field of security systems, and in particular to networked security systems and to IP (internet protocol) data networks, including voice over IP (VoIP) network communication.

BACKGROUND OF THE INVENTION

Security systems, including networked security systems, offer a degree of security for residential sites and for office, business, or industrial applications. Typically, a keypad is provided as part of a security system, which may be used to arm or disarm the security system, for example by setting an alarm, which is triggered upon the occurrence of various threat or alarm conditions. At a larger installation such as in a business, industrial or office setting, more than one keypad may be provided at various locations of the site. The keypad or keypads are typically connected to a security control panel, which is essentially a control board or control module for security for the site. Also, a remote central monitoring station may be connected via a network, and this central monitor station may be notified when an alarm condition, a threat condition, or some other type of security breach, a fire condition, or other type of emergency condition or the like is detected.

In such conventional systems, the problem exists that upon the triggering of an alarm condition or the like, a user, such as a resident, in the case of a home security system, or an employee at an office or at an industrial site, may need to communicate using voice communication with the central monitoring station, with other users, or with police, fire, ambulance, rescue, or other emergency personnel to communicate information about the alarm condition or emergency, and to respond to a query from the central monitoring station or from others about the nature of the emergency. Also, such a user may need to initiate or to authenticate or authorize the disarming of the system upon the triggering of a false alarm or a false emergency condition, or provide information after the alarm condition or the emergency condition has been resolved. Also, a user at a keypad may need to broadcast to one or more keypads during an emergency, the broadcast containing instructions or information or a request for help.

In addition, even in the absence of an emergency or alarm condition, it may be or generally desirable to use the keypad to communicate with users at other keypads, with the central monitoring station, or with people at devices outside of the network security system. Therefore, what is needed is the ability to communicate over the security system, such as between keypad locations, or between keypad locations and a central monitoring station, using voice communication. At present, security systems lack the ability for voice communication. Also, at present, keypads of a security system lack Ethernet and IP connectivity to the internet. It would be desirable to connect the keypad of a the security system network to an internet.

Further, there is a need for an integrated system that allows deployment of a single system for security, voice, such as telephone, and data communication. Such a system may offer a streamlined or low cost alternative to systems involving separate telephone, data network, and security systems.

SUMMARY OF THE INVENTION

A keypad security apparatus and security system are described. The keypad may include a network connector configured to connect the keypad to a data network, an address tracker configured to track an address assigned to the keypad, and a data input configured to receive user input data and to transmit the data via the data network. For example, the network may be a local area network connecting the keypad via a router to an internet. A security control panel may also be logically connected to the local area network. Audio data may be input to the keypad and transmitted via the network voice data over data network, such as voice over IP data. The address assigned to the keypad may be an IP address or a local area network address.

Also, the keypad may be connected via a wireless connector that connects the keypad to the network as a wireless device. According to an aspect of the invention, the audio input of the keypad can be activated by an external node, such as by the central monitoring station, during or after a threat of other emergency condition to enable the external node to receive as voice data audio input from the keypad.

DETAILED DESCRIPTION OF THE INVENTION

The following discussion describes embodiments of Applicant's invention as best understood presently by the inventors however, it will be appreciated that numerous modifications of the invention are possible and that the invention may be embodied in other forms and practiced in other ways without departing from the spirit of the invention. Further, features of embodiments described may be omitted, combined selectively or as a whole with other embodiments, or used to replace features of other embodiments, or parts thereof, without departing from the spirit of the invention. The figures and the detailed description are therefore to be considered as an illustrative explanation of aspects of the invention, but should not be construed to limit the scope of the invention. The scope of the invention is defined by the below-set forth claims.

Figure 2:
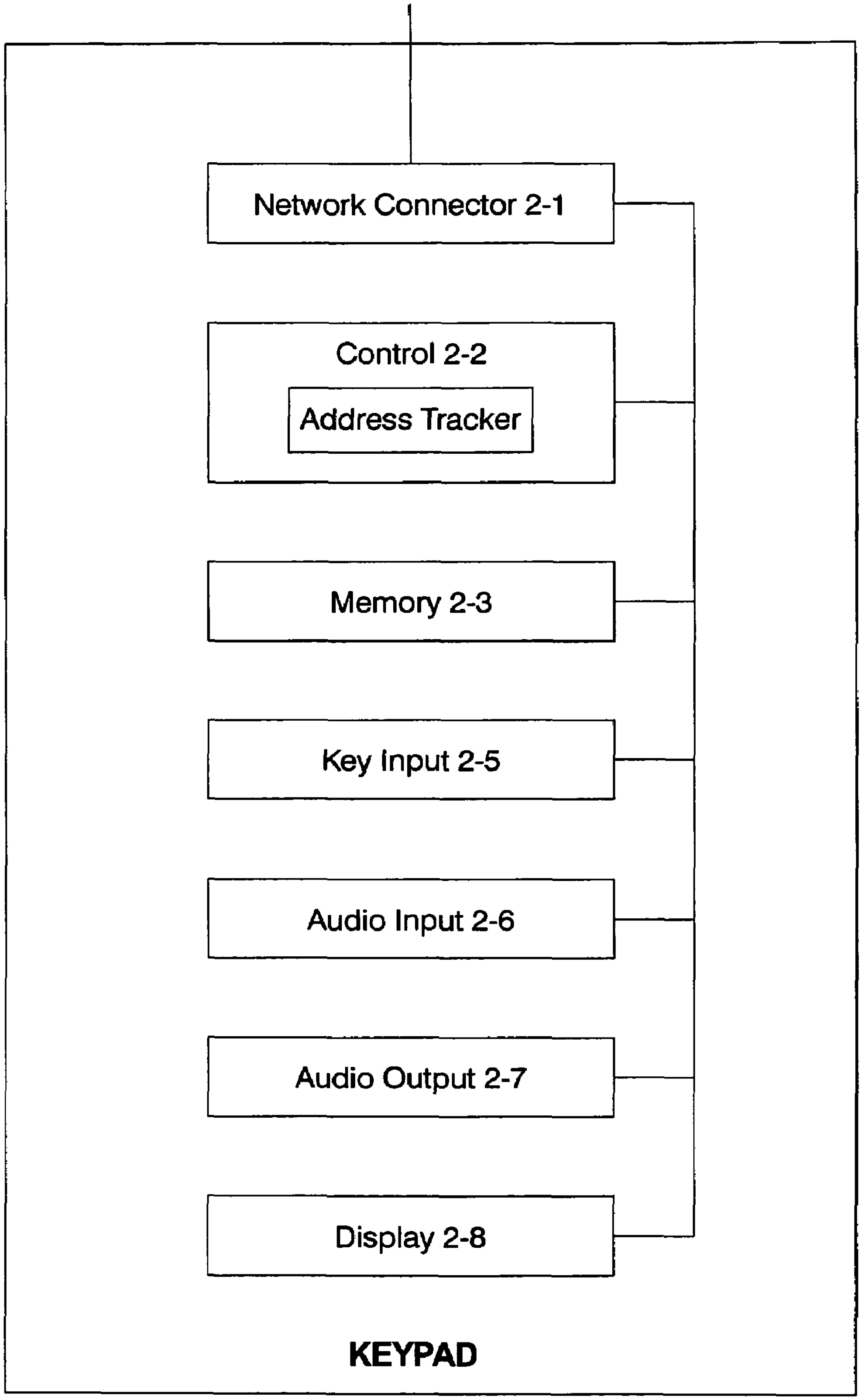
FIG. 2 is a schematic diagram of a keypad security apparatus according to an embodiment of the present invention.

Aspects of the invention will be described with reference to FIG. 2, which is a schematic diagram of a keypad security apparatus according to an embodiment of the present invention. While the user interface for this security system is described herein as a keypad, it will be understood that other types of user interfaces may be used so long as they are suitable to accomplish the purposes of the present invention.

The keypad includes a network connector 2-1 for connecting to a data network embodying a security system via a wired or a wireless connection. For example, the keypad may be connected to an Ethernet or to another type of LAN (local area network), or to another network capable of transmitting data, such as an IP network.

A control 2-2 may include an integrated circuit, such as a chip to control the functioning of the keypad as described herein. Control 2-2 may be configured as hardware, software, firmware, or some combination of the foregoing. The control 2-2 may also include as address tracker 2-9 to track an address, such as an IP address, or MAC address or other type of network address assigned to the keypad. Address tracker 2-9 may also be a separate module from control 2-2. Control 2-2 may request assignment of the address and instruct Memory 2-3 to store the assigned address for the keypad.

Further, the keypad typically includes a key input 2-5 including keys, knobs, buttons, electronic scroll pads, track pads, or the like. A conventional key system for a security system includes keys for the numerals 1-9 and 0 to allow the user to input information to the keypad. The key input 2-5 may also include or be embodied as a full size keyboard, or as a mobile keypad that may be attached to and detached from the user interface as necessary by the user.

Also, the keypad may include an audio input 2-6, such a microphone for receiving voice information from a user, and an audio output 2-7, such as a speaker for providing audio information to the user. Optionally, the keypad may also include a display 2-8, such as an LCD, a CRT, plasma display, or some other type of display that allows a user to receive alphanumeric information, such as an alarm code or alarm sector information, or allows the user to view video or still picture information.

Figure 1:
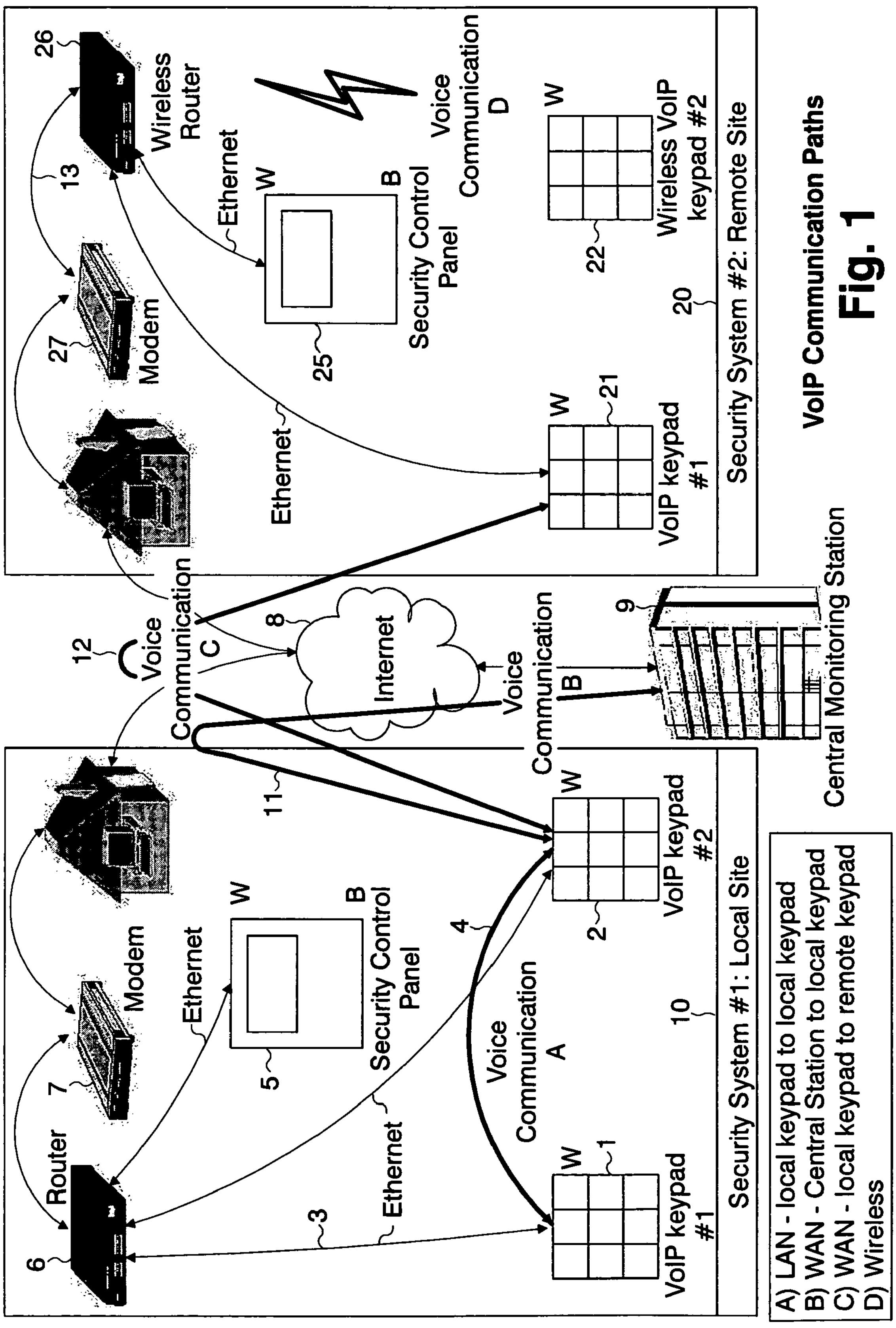
FIG. 1 is a diagram of a system according to an embodiment of the present invention.

Aspects of a system according to an embodiment of a present invention will now be described with reference to FIG. 1. A keypad 1 at security system local site 10 is connected to one of several types of networks. The keypad may be connected to an Ethernet 3, via an Ethernet wire or in a wireless manner to router 6. For example, all keypads and the security control panel 5 of a site may be connected via an Ethernet. Also, the keypad 1 may be connected to a second keypad 2 and to the router 6 via a LAN other than an Ethernet. All arming/disarming of the system and other security system commands would then be transmitted over this Ethernet or LAN. Also, when VoIP is provided, the Ethernet or LAN would carry both system commands and the VoIP traffic. Router 6 may be connected to internet 8 via a modem 7 and a central monitoring station 9 may also be connected to the router 6 via the internet 8. Typically, the central monitoring station 9 has a twenty-four hour security officer who monitors the site 10, and possibly other such sites under the control of the central monitoring station 9 for alarm conditions, fire conditions, and/or other emergencies triggered by various events. The types of threats or emergencies for which a security system is useful, and the triggering conditions for each of these types of threats or emergencies will be well known to those of ordinary skill in the art.

Alternatively, central monitoring station 9 may be connected to the network of the local site 10 via wide area network (WAN). Similarly, a second site 20 may be connected to the central monitoring station 9 and to the internet 8 via a router 26 and modem 27, or the second site 20 may be connected to the central monitoring station 9 via a WAN. For a higher level of security, according to an aspect of the invention, a private network administered by the central monitoring station 9 connects keypads at remote sites.

The security control panel 5 of the local site 10 may be connected via the same network as used by the keypad 1 and keypad 2. Alternatively, the security control panel 5 may be connected to the keypads, 1 and 2 via a proprietary bus. The security control panel 5 of the local site 10 may itself include features similar to those of the keypad shown in FIG. 2, including a network connector, control, address tracker, memory, key input, audio input and output and display. In this way, the security control panel 5 of the local site 10 may itself be assigned a network address, be configured to transmit audio information, including audio information transmitted to the network when prompted by a central monitoring station or other external node. It will be understood that while keypad 1 and keypad 2 are shown as part of the security system of the first site 10, many more such keypads may be used in a larger installation, such as an office application, an industrial site, or other commercial application or the like, and in the alternative, only one keypad may be provided at a smaller site, such as at a residential application, such as a home alarm system. Further, while the central monitoring station 9 of FIG. 2 is shown as being off-site, in a facility requiring a higher level of security, such as in a bank or in certain other high-security applications, such as certain types of government installations, the central monitoring station 9 may be located on the premises of the site 10. The latter type arrangement is sometimes know as a "Class A" installation.

A user (not shown) at keypad 1 of site 10 may wish to activate the security system. This is sometimes called arming the system. At this time the user enters an arming code into the key input 2-5 of keypad 1 and thus arms the system. Central monitoring station 9 is notified via the network that the site 10 is now armed.

Operation of the system will now be described with reference to FIGS. 1 and 2. According to a aspect of the present invention, when a keypad is activated, a unique address, such as an IP address is allocated to the keypad 1. According to an embodiment of the present invention, a user need not arm the system in order to activate the keypad 1 for communication as contemplated for the present invention.

Similarly, security control panel 5 may also be assigned an IP address. The keypads may interface with the security control panel 5 via router 6 if the security control panel 5 is provided with its own IP address. Alternatively, the keypads may be networked to the router and the security control panel 5 may be connected via a proprietary bus.

The keypad 1 can be used to communicate with the security panel 5 or keypad 2 of site 10, or with the central monitoring station 9, with keypad 21 or keypad 22 of remote site 20 via one or more of the networks above-described, without necessarily arming the system. For example, keypad 1 may communicate via Ethernet 3 router 6 and modem 7 with any one of keypad 21, keypad 22, or central monitoring station 9 via internet 8 or via a WAN. According to an aspect of the invention, the user may communicate with one or more of the above-listed nodes even when there is no emergency or alarm condition, by sending data.

According to a preferred embodiment of the present invention, voice input may be entered via audio input 2-6 of the keypad 1 to send voice over IP (VoIP) data over the network to any one or more of the previously mentioned devices. Also, according to an embodiment of the present invention, the internet 8 is connected via a gateway to a telephone system, such as POTS (Plan Old Telephone System), thus allowing the user at keypad 1 to communicate with any telephone by sending voice over IP data through the keyboard. For example, a home alarm keypad user can communicate using voice over IP with any other keypad user using a compatible system or with any telephone. Also, a user at keypad 1 can broadcast to some or all of the other keypads at site 10 or to other keypads at other security networks and/or security panels or the central monitoring station.

According to an embodiment of the present invention, features set at the central monitoring station 9, determine whether a user at keypad 1 may access nodes outside of site 10, or outside of another site 20 controlled by the same central monitoring station 9. For example, the universe of nodes that may be called from keypad 1 may be set by the central monitoring station 9 and may be limited to some or all of the other keypads at the same local site 10 or may be limited to all keypads controlled by the central monitoring station 9 including keypads 21 and 22 at site 20. Alternatively, these limits may be programmed or hardwired into keypad 1 at the time of installation, such as via codes unknown to most users 1.

According to an aspect of the invention, central monitoring station 9 can initiate communication with the keypad 1, or with additional keypads, without any previous operation performed to the keypad 1. This is particularly advantageous during an emergency when information may be required about various locations of the site 10. For example, central monitoring station 9 can initiate a voice session with keypad 1 during an emergency, to check whether anyone is present or whether any clues about the alarm condition or emergency can be ascertained from the location around keypad 1. One or more speakers configured as part of the keypad 1 or connected thereto can convey audio information from the central monitoring station 9 or from emergency personnel, such as rescue, ambulance, medical, fire safety, or police personnel.

Further, the user at keypad 1 or keypad 2 can provide information to central monitoring station 9 or emergency personnel about the emergency, or can trigger an emergency condition. Also, a user at keypad 1 or keypad 2 may be able to authorize the disarming of the system after the triggering of an emergency condition, including the false triggering of an emergency condition. For example, a user at keypad 1 can transmit via the network using voice or by other means a secret code agreed in advance, to authorize the disarming of the system after the triggering of an emergency condition, such as an alarm. According to an embodiment of the present invention, a single network may be deployed at a site 10 which serves as the security network for the site, but also satisfies the site's telephone and/or data network requirements. In this way, a streamlined network can provide telephone services, data network services and a security system for an installation. Fewer wires may thus be required and a less expensive installation or operation cost may be achieved. As discussed, according to an embodiment of the invention, keypad 1 is connected to an internet 8, thus allowing communication with any user at a node connected to the internet. Further, when the keypad 1 uses a voice over IP application, the keypad 1 may be connected via the internet 8 with any telephone user.

Preferred embodiments and methods of the present invention discussed in the foregoing are to be understood as descriptions for illustrative purposes only, and it will be appreciated that numerous changes, substitutions, omissions, and updates thereof are possible without departing from the spirit and scope of the claims.

What is claimed is:

1. A security system comprising:

a plurality of keypad security apparatuses, each keypad apparatus including a single audio input and a single audio output, the audio input and output configured to directly receive audio data and to directly transmit the audio data as voice over data packets over a local area network within the security system and over an external network connected to the security system;

a respective unique network address allocated to each of the plurality of keypad security apparatuses upon activation;

a router logically connected via the local area network to each of the keypad apparatuses, the router configured to logically connect each keypad apparatus to the external network and to transmit to the keypad apparatus via the local area network the assigned address; and a security control panel logically connected to the local area network, wherein within the security system one keypad apparatus receives the audio data from and transmits the audio data to another keypad apparatus as voice over data packets over the local area network, said receiving and transmitting of the audio data bypassing the security control panel.

2. The security system of claim 1, the security control panel comprising an audio input configured to receive audio information and to transmit via the local area network the audio information as voice over IP data.

3. The security system of claim 1, the security control panel comprising a programmable table configured to track an address assigned to the security control panel.

4. The security system of claim 1, wherein at least one keypad apparatus is logically connected to a central monitoring station.

5. The security system of claim 1, wherein at least one keypad apparatus is activated by an external node in connection with an emergency condition to enable the external node to at least one of receive audio input from the activated keypad apparatus, and transmit audio information to the activated keypad apparatus.

6. The security system of claim 1, wherein the router is logically connected via the external network to a second router at a second site different from a site of the router.

7. The security system of claim 1, wherein at least one keypad apparatus is logically connected via a wide area network to a second keypad at a second site different from a site of the at least one keypad apparatus.

8. The security system of claim 6, wherein the second router at the second site is logically connected to a second keypad configured to transmit voice over IP data.

9. The security system of claim 1, wherein the router is a wireless router.

10. The security system of claim 1, wherein the local area network is an Ethernet.

* * * * *